United States Patent
Addy

(10) Patent No.: US 9,900,726 B2
(45) Date of Patent: Feb. 20, 2018

(54) WIRELESS SYSTEMS WITH M2M COMMUNICATIONS VIA A COMPUTER NETWORK WITH A CELLULAR-TYPE BACK-UP NETWORK

(71) Applicant: Honeywell International Inc., Morristown, NJ (US)

(72) Inventor: Kenneth L. Addy, Massapequa, NY (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 54 days.

(21) Appl. No.: 14/629,045

(22) Filed: Feb. 23, 2015

(65) Prior Publication Data

US 2016/0249154 A1 Aug. 25, 2016

(51) Int. Cl.
| | |
|---|---|
| H04W 4/00 | (2018.01) |
| H04W 88/06 | (2009.01) |
| H04W 8/18 | (2009.01) |
| H04W 36/14 | (2009.01) |
| H04W 4/08 | (2009.01) |
| H04W 8/26 | (2009.01) |
| H04W 48/18 | (2009.01) |

(52) U.S. Cl.
CPC ........... *H04W 4/005* (2013.01); *H04W 8/183* (2013.01); *H04W 36/14* (2013.01); *H04W 88/06* (2013.01); *H04W 4/08* (2013.01); *H04W 8/26* (2013.01); *H04W 48/18* (2013.01)

(58) Field of Classification Search
CPC ......... H04W 4/005; H04W 4/08; H04W 8/26; H04W 61/2069; H04W 12/18
See application file for complete search history.

(56) References Cited

U.S. PATENT DOCUMENTS

| | | | |
|---|---|---|---|
| 8,518,208 B2* | 8/2013 | Kohli | C09J 163/00 156/330 |
| 2010/0248690 A1* | 9/2010 | Biggs | H04W 36/385 455/411 |
| 2011/0053619 A1* | 3/2011 | Shaheen | H04W 4/00 455/466 |
| 2011/0217969 A1* | 9/2011 | Spartz | H04W 36/14 455/422.1 |

(Continued)

FOREIGN PATENT DOCUMENTS

WO  WO 2011/025876 A1  3/2011

OTHER PUBLICATIONS

Extended European search report from corresponding patent application EP 16155351.6, dated Jun. 17, 2016.

*Primary Examiner* — Ian N Moore
*Assistant Examiner* — Mewale Ambaye
(74) *Attorney, Agent, or Firm* — Husch Blackwell LLP

(57) ABSTRACT

A communications network is available to implement at least M2M communications between a transmitting unit and a receiving unit. The units can communicate via the Internet as a primary network. They can also communicate via a cellular-type network. At least some of the units include respective subscriber information to provide access and services via the networks. Groups of units can share a common data plan with other related units. Subscriber information can be included in respective SIM cards. At least one of the SIM cards can provide voice or data service via the common data plan.

7 Claims, 1 Drawing Sheet

(56) References Cited

U.S. PATENT DOCUMENTS

| | | | | |
|---|---|---|---|---|
| 2013/0340059 A1* | 12/2013 | Christopher | .......... | H04W 12/04 726/7 |
| 2015/0023244 A1* | 1/2015 | Shaheen | ............... | H04W 4/005 370/312 |
| 2016/0044178 A1* | 2/2016 | Narayanaswamy | .... | H04M 3/54 455/558 |

\* cited by examiner

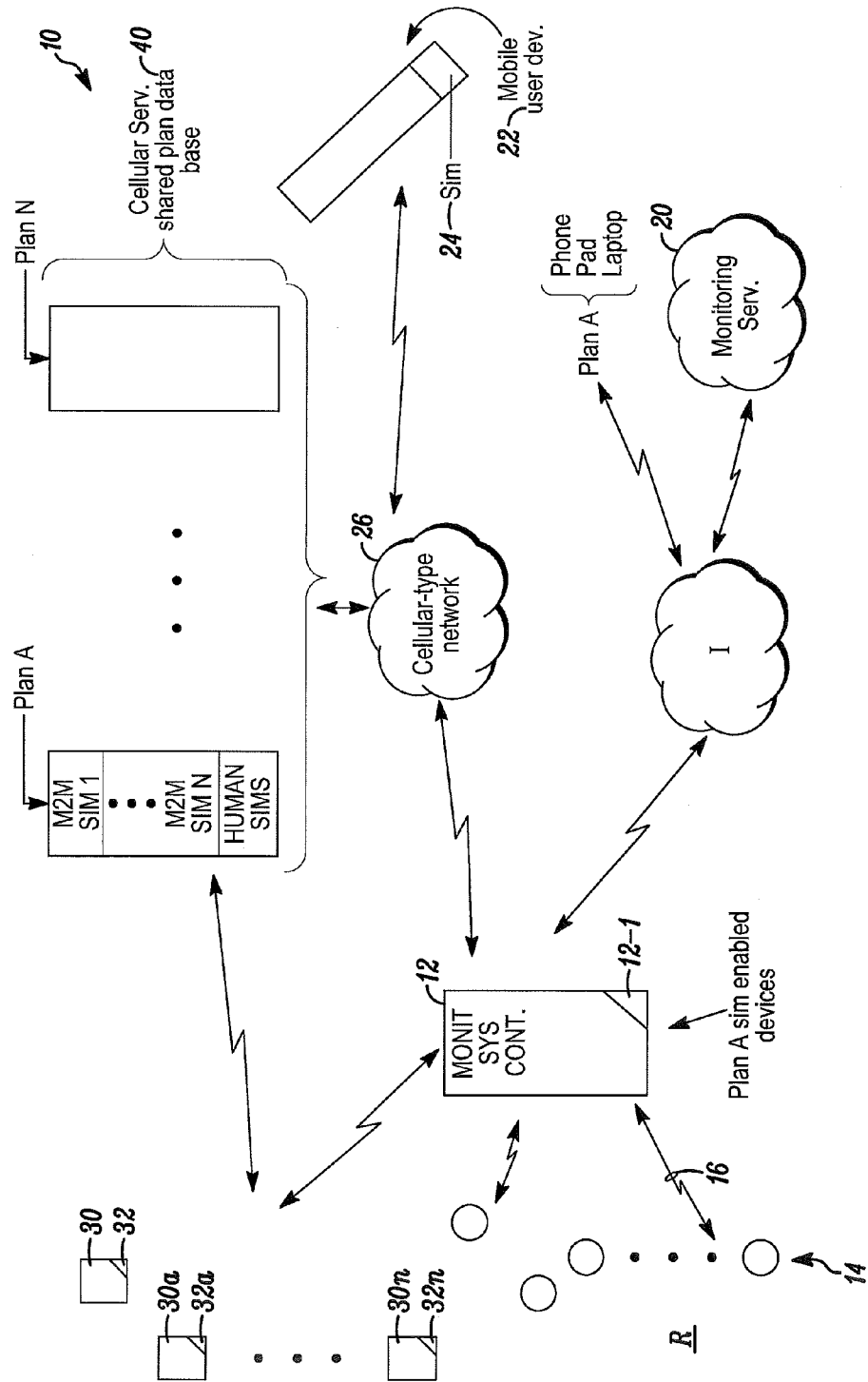

WIRELESS SYSTEMS WITH M2M COMMUNICATIONS VIA A COMPUTER NETWORK WITH A CELLULAR-TYPE BACK-UP NETWORK

FIELD

The application pertains to wireless communications via a computer network, such as the Internet, with a cellular-type back-up network. More particularly, the application pertains to such configurations wherein connection with the back-up network, M2M SIM cards, and associated devices share a data plan with human users.

BACKGROUND

There is increasing use of cellular communications networks for the transport of alarm messages via sub-systems to alarm monitoring central stations. At the same time, there is increasing interest in self-monitoring of security systems by an end-user who might want a reported event to be sent directly to a cell phone rather than to a central station—this avoids a monitoring fee of the central station. This can be done with an alarm system that reports over the Internet, but if the Internet is down at a monitored location, there is no back up.

The addition of an alternative path for an alarm report over a mobile radio network is an alternative, but a monthly cost of such a service, via a mobile subscriber identification module (SIM card) or equivalent in the alarm system, may be high—even in comparison with the CS monitoring fees. Also, most mobile phone service providers now provide grouped service plans for family and friends.

Further, home control from a remote location is becoming more widely available. For example, a home owner may want to turn on lights and locks from the remote location. These edge devices currently use zwave, zigbee and other low power protocols. However, the possibility of home control directly via a cellular module in a device in a home is technologically feasible.

BRIEF DESCRIPTION OF THE DRAWINGS

FIG. 1 is a block diagram illustrating embodiments hereof.

DETAILED DESCRIPTION

While disclosed embodiments can take many different forms, specific embodiments hereof are shown in the drawings and will be described herein in detail with the understanding that the present disclosure is to be considered as an exemplification of the principles hereof as well as the best mode of practicing the same and is not intended to limit the claims hereof to the specific embodiment illustrated.

In accordance herewith, groups of humans and machines can be associated with a common voice, data plan of a cellular-type service provider. In embodiments hereof, a share plan can include M2M SIM's (or equivalent) associated with respective electrical units. Such units usually consume small amounts of data compared to human sharers of the plan. A home owner could then share a data plan with other SIM's (or equivalent) in machines in a home that could remotely interact with the human sharers on the plan. This "Machine and Family" plan enables mobile phone system operators to transport more data, sell more SIM's, potentially achieve "stickiness" in their installations, and reduce account attrition. It provides secure, low latency remote interaction to end-users with their home devices and machines from a remote location via the web or a mobile phone.

As those of skill will understand, some devices or plans are now "SIM-less". For example, a subscriber module may be electronically in a device.

In the same way as family voice/data SIM's can be grouped in accounts in the service provider's billing and back-office database, additional M2M, data-only SIM's (or equivalent) could be grouped to allow interaction with mobile phones in the share plan.

It will be understood that other devices, such as locks, lights, and thermostats, alone or in various types of security, gas, or fire detection or building control systems, come within the spirit and scope hereof. The block diagram of FIG. 1 illustrates aspects of an exemplary system 10 in accordance herewith.

In one aspect, the system 10 can be associated with a building or a home, indicated generally at R. A monitoring or alarm system associated with the building or the home R can include a monitoring system local control unit 12 and an associated plurality 14 of detectors, audible or visual input/output devices, and the like. The devices 14 can be in wired or wireless communications with the unit 12 via a medium 16.

In one embodiment, the monitoring system control unit 12 can report conditions, per the plurality 14, via a primary communications network, for example, the Internet I, to a monitoring service facility 20. The service facility 20, upon evaluation, can report, also via the Internet I, to a user's wireless, mobile communications device 22.

The unit 12 can also be provided with a SIM card (or equivalent) 12-1 and be enabled to communicate via a cellular-type communications network 26. As those of skill in the art will understand, the unit 12 can be configured such that the Internet I functions as the primary communications network for the unit 12 to communicate with the service facility 20 or directly to the user's device 22. Alternately, in the loss of service of the primary communications network I, the cellular-type communications network 26, via the SIM card (or equivalent) 12-1, can provide a primary communications path, or alternatively, a back-up communications capability between the unit 12 and the service facility 20 or the user's device 22. It will be understood that the device 22 includes a SIM card 24 to provide network access. Hence the user's device 22 can have two communications networks available, as needed, to receive information or issue commands to the monitoring system control unit 12.

The building or the home R might be serviced by a variety of other types of electrical units not part of the monitoring system local control unit 12. Such units, indicated at 30, 32a ... 32n, could include, but are not limited to Internet enabled thermostats, door lock/unlock units, garage door closers, sump pump monitoring systems, external or internal lighting controls, HVAC control units, and external or internal video monitors. Such devices could communicate bi-directionally, via the Internet or directly if a cell phone module is included in the machines themselves, to the user's mobile device 22.

Where the Internet is designated as the primary communications network, back-up service could also be provided to the units 30 ... 30n via the cellular-type network 26. In this regard, the units 30 ... 30n can each include an M2M SIM card (or equivalent), such as 32, 32a ... 32n. Those SIM cards provide access to and service from the network 26.

In providing services, the network 26 can make available to its users multi-device, shared, access plans, such as Plan A, Plan B . . . Plan N. Such plans each can be associated with a respective file in a shared plan database 40 to conveniently and economically support a plurality of M2M devices or units, such as 12, 30, 30a . . . 30n, in the same account. Additionally, the user's device 22, via the SIM card 24, can be included in Plan A and provide not only data services, but also audio per the user's request via a common machine and family plan.

In summary, in embodiments hereof, groups of human users and machines that communicate via a cellular-type network can be associated with a common voice-data service plan of a network service provider.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

Further, logic flows depicted in the figures do not require the particular order shown or sequential order to achieve desirable results. Other steps may be provided, steps may be eliminated from the described flows, and other components may be added to or removed from the described embodiments.

The invention claimed is:

1. A system comprising:
   a monitoring system control unit associated with a building or a home and configured to transmit machine-to-machine ("M2M") information on a first network;
   a first subscriber identification module, wherein the first subscriber identification module is associated with the monitoring system control unit to enable the monitoring system control unit to access and communicate via a cellular network different from the first network, and wherein the first subscriber identification module is associated with a first cellular, data-only access plan;
   a mobile phone associated with a user and configured to provide audio communication services and cellular data communications;
   a second subscriber identification module associated with the mobile phone and configured to enable the mobile phone to access the cellular network, wherein the second subscriber identification module is associated with a voice and data cellular access plan that facilitates the audio communication services and the cellular data communications; and
   a database associated with the cellular network, wherein the database includes a file that associates the first cellular, data-only access plan and the voice and data cellular access plan with a common access authorization,
   wherein the common access authorization is a common voice and data cellular service account provided by a cellular service provider associated with the cellular network, and
   wherein the first cellular, data-only access plan enables the monitoring system control unit to communicate only with the mobile phone via the cellular network.

2. The system as in claim 1, wherein the first subscriber module is a second SIM.

3. The system as in claim 1, wherein the cellular network comprises a back-up network.

4. The system as in claim 3, wherein the first subscriber module is a second SIM.

5. The system as in claim 1, further comprising:
   an electrical unit selected from a class that includes at least locks, lights, thermostats, heating or air conditioning equipment, gas detection equipment, fire detectors, garage door closers, sump pump control systems, video cameras, and video monitoring systems; and
   a third subscriber identification module, wherein the third subscriber identification module is associated with the electrical unit to enable the electrical unit to access and communicate via the cellular network, and wherein the electrical unit is associated with a second cellular, data-only access plan.

6. The system as in claim 5, wherein the first subscriber module is a second SIM, and wherein the second subscriber module is a third SIM.

7. A method comprising:
   associating a monitoring system control unit with a building or a home;
   configuring the monitoring system control unit to transmit machine-to-machine ("M2M") information on a first network;
   associating a first subscriber identification module with the monitoring system control unit to enable the monitoring system control unit to access and communicate via a cellular network different from the first network, wherein the first subscriber identification module is associated with a cellular, data-only access plan;
   associating a mobile phone with a user;
   configuring the mobile phone to provide audio communication services and cellular data communications;
   associating a second subscriber identification module with the mobile phone to enable the mobile phone to access the cellular network, wherein the second subscriber identification module is associated with a voice and data cellular access plan that facilitates the audio communication services and the cellular data communications;
   associating a data base with the cellular network, wherein the data base includes a file that associates the cellular, data-only access plan and the voice and data cellular access plan with a common access authorization;
   implementing the common access authorization by a third subscriber identification module associated with the monitoring system control unit that enables any communication via the cellular network, wherein the common access authorization is a common voice and data cellular service account provided by a cellular service provider associated with the cellular network; and
   the cellular, data-only access plan enabling the monitoring system control unit to communicate only with the mobile phone via the cellular network.

* * * * *